United States Patent [19]

Janiszewski

[11] Patent Number: 5,156,066

[45] Date of Patent: Oct. 20, 1992

[54] FLYWHEEL FOR AN INTERNAL COMBUSTION ENGINE

[75] Inventor: Grzegorz Janiszewski, Angered, Sweden

[73] Assignee: AB Volvo, Goteborg, Sweden

[21] Appl. No.: 584,242

[22] Filed: Sep. 18, 1990

[30] Foreign Application Priority Data

Sep. 20, 1989 [SE] Sweden .................... 8903093

[51] Int. Cl.⁵ ............................. F16F 15/10
[52] U.S. Cl. .................. 74/574; 192/106.2; 464/66; 74/572
[58] Field of Search .......... 74/572, 574; 192/106.1, 192/106.2; 464/63, 66, 68

[56] References Cited

U.S. PATENT DOCUMENTS

| 4,484,898 | 11/1984 | Kohno | 464/68 |
| 4,493,673 | 1/1985 | Anders et al. | 464/66 |
| 4,816,006 | 3/1989 | Friedmann | 74/574 |
| 4,838,395 | 6/1989 | Chasseguet et al. | 74/574 |
| 4,891,033 | 1/1990 | Heyser | 192/106.2 |
| 4,944,712 | 7/1990 | Worner et al. | 74/574 |
| 4,961,487 | 10/1990 | Langeneckert | 74/574 |
| 4,983,142 | 1/1991 | Despres et al. | 74/574 |
| 4,987,980 | 1/1991 | Fujimoto | 192/106.2 |

FOREIGN PATENT DOCUMENTS 2826274 12/1978 United Kingdom.
2160296 12/1985 United Kingdom.
2163524 2/1986 United Kingdom.
2193789 2/1988 United Kingdom.
2214610 9/1989 United Kingdom.

Primary Examiner—David A. Scherbel
Assistant Examiner—Winnie Yip
Attorney, Agent, or Firm—Young & Thompson

[57] ABSTRACT

Flywheel device for internal combustion engines. The device has a first flywheel mass (1) intended to be coupled to the engine crankshaft, and a second mass (2) with a frictional surface (12) designed to carry a clutch cover with associated pressure plate. Via first and second springs (40a, 40b), laid in channel (17), and fingers (5,6,18) torque is transmitted between the masses. In the torque-unloaded state, there is a small play ("s") between the second springs (40b) and the adjacent fingers. When low torque is transmitted (idle), only the first springs (40a) are active.

5 Claims, 3 Drawing Sheets

FLYWHEEL FOR AN INTERNAL COMBUSTION ENGINE

FIELD OF THE INVENTION

The present invention relates to a flywheel device for internal combustion engines, comprising a first flywheel mass intended to be connected to an output shaft from the engine, a second flywheel mass intended to be coupled via a friction clutch to an input shaft of a transmission, and spring means acting between said masses for transmitting torques between said masses.

BACKGROUND OF THE INVENTION

In designing the drive train for a passenger car with a manual transmission, in recent years greater attention has been paid to the problem of damping transmission noise such as rapping at idle and rattle. Rapping at idle occurs when the car is stationary and the engine is idling, while rattle occurs when the car is driven and the drive train is loaded. Both are caused by the fact that the harmonic torque of the engine gives rise to a torsional oscillation cycle in the gearbox when the primary shaft of the gearbox is subjected to an angular acceleration by the primary shaft gear and its input shaft is then retarded by the engine and by the drag torque of the gearbox.

A known method of dampening rapping at idle and rattle is to reduce these torsional oscillations by dividing the engine flywheel into two masses with an intermediate torque transmitting spring and damping system. Such a system replaces the spring and damping device arranged in the disc center of a conventional clutch. The double mass flywheel with an intermediate spring system functions as a mechanical "low pass filter" and by suitable dimensioning of the components it can reduce the natural frequency of the torsional oscillations from 40-70 Hz, corresponding to the rpm range at which the engine operates under normal conditions, to about 15 Hz, which lies below the normal idle rpm of the engine.

In a known double mass system functioning according to the principle described, the spring system itself has two different types of springs, lying in series with each other and having different spring characteristics. When idling under absence of torque, torque is transmitted from the weaker to the stronger springs, producing a natural resonance in the system which is significantly below the idle rpm of the engine. When the engine is driving or during engine braking, the weaker springs are completely compressed and the damping during torque transmission is effected entirely by the stronger springs. The natural resonance of the system will then be above the idle frequency but below the frequency of the lowest rpm for the loaded engine. A disadvantage of the known system is, however, poor drivability, i.a. because of the fact that the soft springs make the relative rotation between the flywheel masses be so great during certain operating conditions that the drive train will be "stretched" and the driving will be "wobbly". The fewer the cylinders are and the higher the engine torque is in the system, the greater the problem will be.

OBJECT OF THE INVENTION

The purpose of the present invention is to provide a flywheel device of the type described by way of introduction, which in a simple manner and with simple means solves the above mentioned problems, especially in a transmission system for engines with high torque and few cylinders, e.g. four-cylinder engines.

SUMMARY OF THE INVENTION

This is achieved according to the invention by virtue of the fact that first and second spring means are arranged to transmit torque between the masses, the first spring means being disposed without play between support means joined to said masses, while said second spring means, in the torque-unloaded state of the masses, are arranged with play between cooperating supporting means joined to the masses.

By arranging the spring means in this matter, a spring system is achieved in which one set of springs, i.e. the first spring means, is always in effect, while the second set of springs, i.e. the second spring means, first comes into effect when the relative rotation between the flywheel masses corresponds to the play between the supporting means and the second springs. The result will be that at idle, when the torque is low, only the first spring means will be in effect. At higher torques, the first and second spring means cooperate. Thus, at idle there is achieved effective damping of idle rapping by the action of springs with relatively little stiffness, and when higher torques are transmitted, the springs cooperate to form a spring system with greater stiffness, providing effective damping of rattle without permitting a relative rotation between the flywheel masses which could produce poorer drivability.

By joining, in accordance with a preferred embodiment of the flywheel device according to the invention, the first and second spring means to each other by means of a centering means which, in the torque-unloaded state, center the second spring means between the cooperating support means, the second spring means are prevented at idle from "bouncing" between their support means and creating their own noise.

BRIEF DESCRIPTION OF THE DRAWINGS

The invention will be described in more detail below with reference to an example shown in the accompanying drawings, wherein.

DETAILED DESCRIPTION OF THE INVENTION

Figure 1:
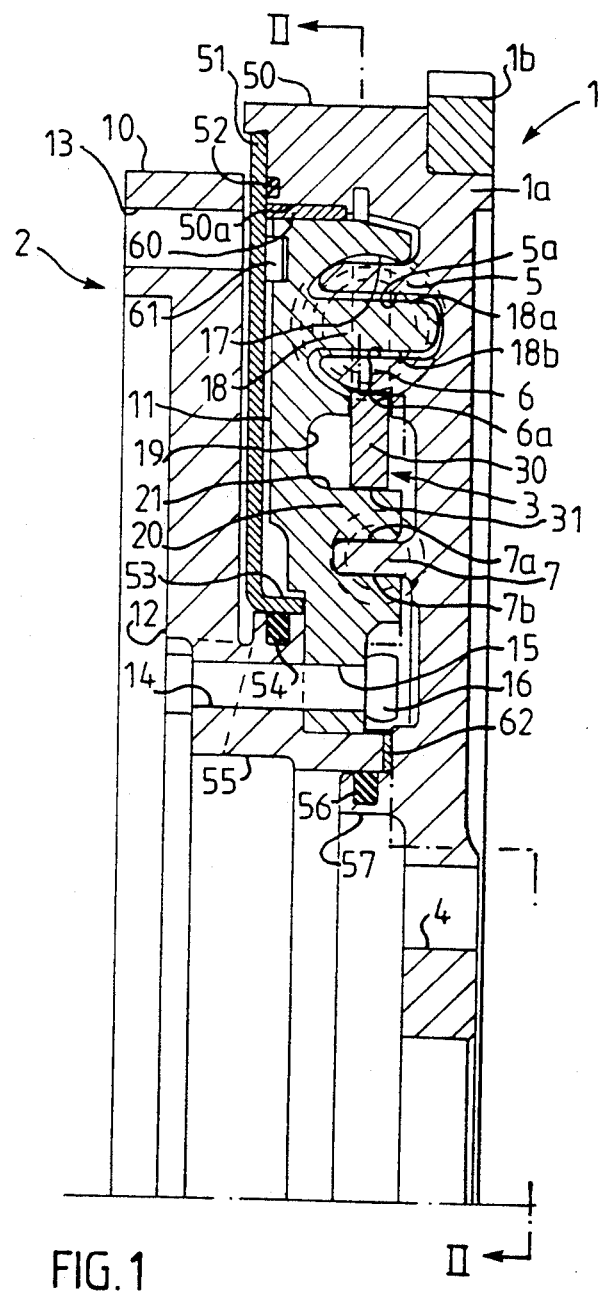
FIG. 1 shows a longitudinal section through a flywheel device according to the invention.

The flywheel device consists of two separate masses which are rotatable relative to each other and are generally designated 1 and 2.

The mass 1 is made up of a cast and turned metal disc 1a with a shrunk-on gear rim 1b which is the engine's start rim. A disc 1a is designed to be screwed on to a flange (not shown) on the engine crank shaft end, and for this purpose it has mounting screw holes 4 spaced along a circle. Four pairs of fingers 5 and 6 are spaced at 90° angles, cast in one piece with the disc 1a, said fingers having facing machined surfaces 5a,6a. Radially inside the fingers 5,6 there is a pair of additional fingers 7, placed diametrically opposite to each other. The radially inner fingers 7 are cast in one piece with the plate 1a, and they have turned outer surfaces 7a,7b.

The mass 2 consists of a first cast and turned annular metal disc 10, forming a friction plate for a clutch, and a second cast and turned metal ring 11, forming a spring holder. The disc has a faced friction surface 12 for the clutch disc (not shown) and is provided in the vicinity of its periphery with screw holes 13 spaced along a circle, by means of which a clutch cover (not shown) with a pressure plate is securely screwed to the disc 10. In the vicinity of its inner periphery the disc 10 has holes 14 spaced along a circle.

The ring 11 has corresponding holes 15 and is fixed to the disc 10 by means of rivets 16 in the holes 14,15. The ring 11 is cast with a circular, essentially U-shaped channel 17, and with four fingers 18 projecting from the bottom of the channel, said fingers being displaced 90° from each other and oriented relative to the fingers 5,6 of the mass 1 so that each of said fingers 18 in a certain relative position of the masses 1 and 2, lies between an individual pair of fingers 5,6. The surface portions 17a,17b of the channel 17 on either side of the fingers 18 are turned as are the lateral surfaces 18a,18b of the fingers 18. The ring 11 is also cast with a circular channel 19 radially inside the channel 17. The portion 20 of the ring 11 radially inside the channel 19 forms a shoulder with a turned circular surface 21, serving as a bearing surface for a centering ring 30.

When casting the ring 11 of the second mass 2, there are created as well circular arcuate depressions 22 with an essentially U-shaped cross section and arranged in pairs. Between the depressions 22 in each pair there are circular-arcuate slots 23, into which the inner fingers 7 of the first mass 1 extend.

Figure 2:
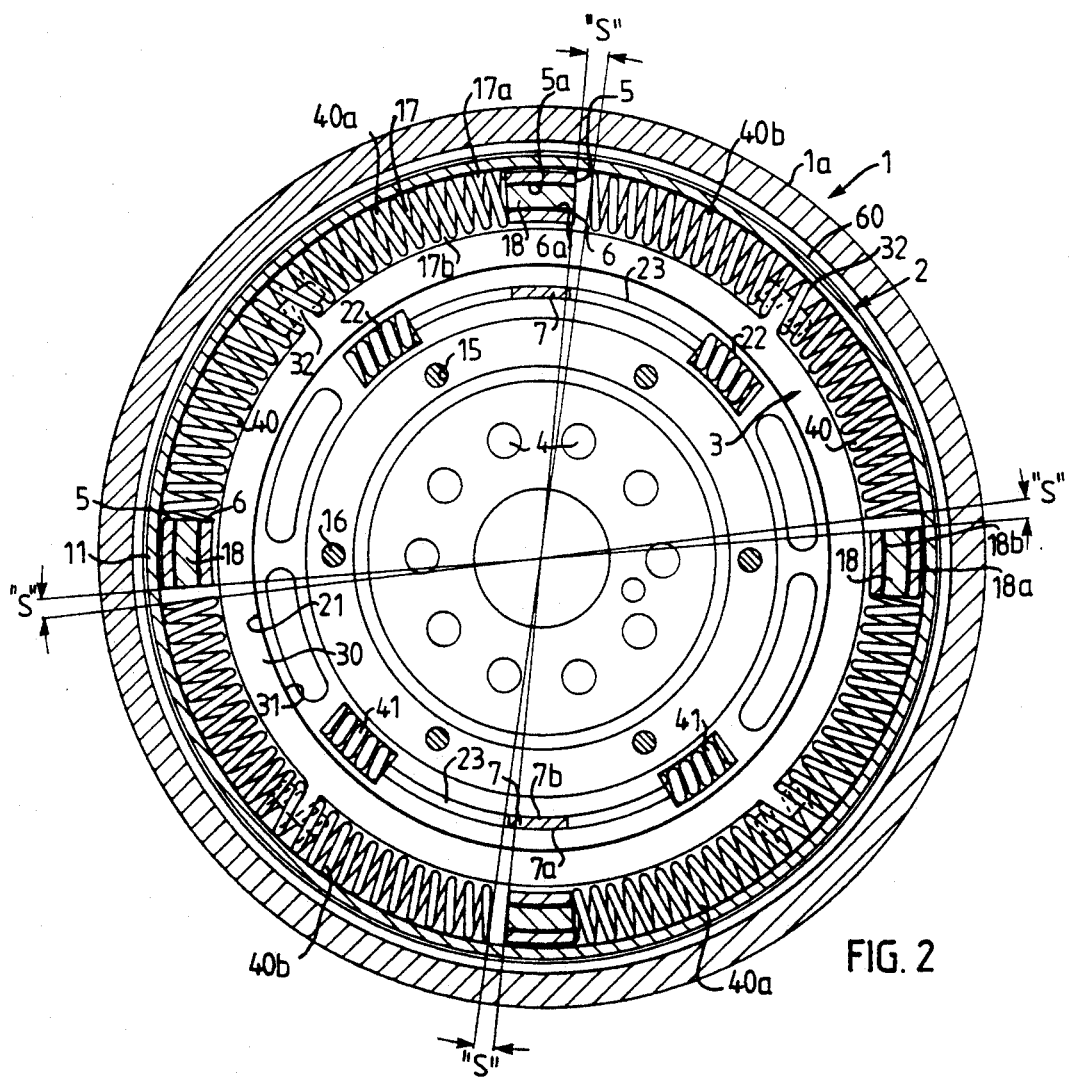
FIG. 2 shows a cross section along the line II—II in FIG. 1.

The centering ring 30 is formed by a relatively thin metal ring, which can be stamped or cut and has a radially inner surface 31 which forms a bearing surface and rests against the surface 21 of the ring 11. The ring 30 is made in one piece with four oblong projections 32 evenly spaced about the periphery and which lie in the channel 17 of the ring 11. These projections are "screwed into" the center portion of helical springs 40a,40b lying in the channel 17, the ends of each spring abutting against the fingers 5, 6 and 18, respectively, of the masses 1 and 2, respectively. As can be seen in FIG. 2, the projections 32 are shaped and arranged so that when the flywheel device is not subjected to torque, the projections 32 lie midway between pairs of adjacent groups of fingers 5, 6 and 18, as shown in FIG. 2. The Figure also reveals that the springs 40a lie without play between the groups of fingers, while the springs 40b have a small play "s" with the adjacent finger groups on either side.

The disc 1a of the mass 1 is made with cast and possibly turned depressions (not shown) which supplement the channel 17 and the depressions 22 in such a way that essentially closed cavities are formed, essentially circular in cross section for the springs 40a,40b and the springs 41. The purpose of the latter is, by cooperation with the inner fingers 7, to damp impact when there is an extreme overloading of the system. The cavities defined by the disc 1a and the ring 11 are filled with a medium having lubricating and damping properties. The disc 1a is machined so that a flange 50 is formed which extends axially over the ring 11. A cover plate 51 is fixed to the end of said flange 50 with a seal 52 therebetween. The cover plate 51 has an inner flange 53 abutting against a seal 54 in a groove in a flange portion 55 of the disc 10. A further seal 56 in a groove in a radially inner flange 57 on the disc 1a completes the sealing-off of the cavities with respect to the surroundings.

Between the inner surface 50a of the flange 50 and an opposing radial surface of the ring 11, there is a radial bearing 60 in the form of a teflon ring for example. Axial forces in the system are taken up by a thrust-bearing 61 between the cover plate 51 and the ring 11 and a more central thrust-bearing 62 between the disc 1a and an end surface on the flange portion 55 of the disc 10.

Figure 3:
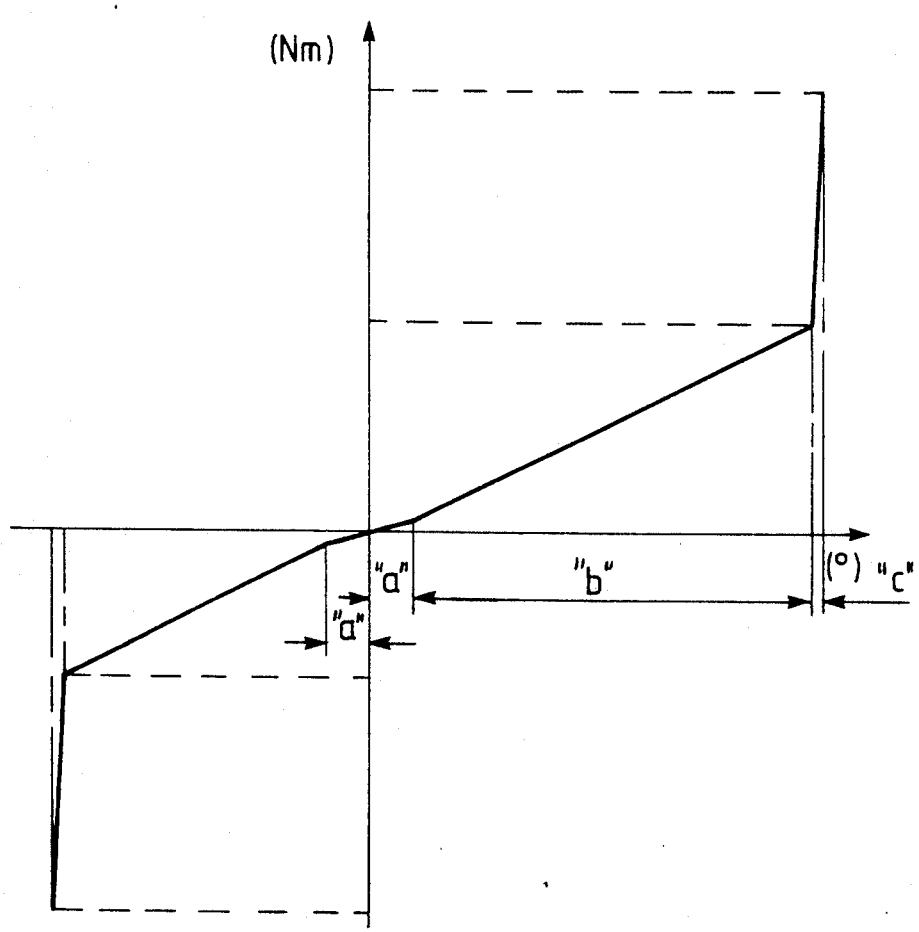
FIG. 3 shows a diagram of the spring characteristic of the device.

The play "s" means that at low torque when the engine is idling, only the springs 40a will be active and the spring system will have the characteristic shown within the range "a" in FIG. 3. As soon as the relative rotation between the masses, due to increasing torque, exceeds the play "s", the spring system will have the characteristic shown within the range "b". Within the range "c", the curve becomes much more steep due to the fact that the springs 41 come into play.

I claim:

1. Flywheel device for internal combustion engines comprising a first rotatable flywheel mass adapted to be connected to an output shaft from the engine, a second rotatable flywheel mass adapted to be coupled via a friction clutch to an input shaft of a transmission, and spring means acting between said masses for transmitting torque between said masses, said spring means comprising first and second spring means (40a, 40b) arranged to transmit torque between the masses, the first spring means (40a) being disposed without a play between support means (5, 6, 18) that are rigidly joined to said masses (1, 2), while said second spring means (40b), in the torque-unloaded state of the masses, is arranged with a play ("s") between cooperating said support means (5, 6, 18), and wherein each said first and second spring means (40a, 40b) is joined to a respective centering means (30, 32), such that in the torque-unloaded state, the centering means of said second spring means (40b) centers the second spring means (40b) between said cooperating support means (5, 6, 18) in the direction of rotation of said masses in an unbiased state.

2. Device according to claim 1, wherein the masses (1, 2) define together at least one cavity (17) curved in a circular arcuate rotational direction of the masses, in which cavity said first and second spring means (40a, 40b) are disposed, and the masses are provided with abutments (5, 6, 18) projecting into the cavity, said abutments constituting said cooperating support means and being arranged on either side of the helical spring means, the abutments, when there is torque load with subsequent relative rotation between the masses, being displaced in opposite directions to initially compress only said first spring means (40a) and after a certain initial relative rotation, also compress said second spring means (40b).

3. Device according to claim 1, wherein said centering means are formed by an annular element (30), which is rotatably journalled on one of the masses (1, 2) and has projections (32) engaging with said first and second spring means (40a, 40b).

4. Device according to claim 3 wherein the projections (32) of the centering means (30) engage an intermediate portion of the respective helical spring means (40b) and have portions directed in the rotational direction for radially fixing the intermediate portion of the spring means and balancing the centrifugal and reaction forces acting on the spring means.

5. Device according to claim 2, wherein the circular arcuate curved cavity (17) forms a closed circle, a plurality of evenly spaced groups of said abutments (5, 6, 18) extending into the cavity and a plurality of said spring means (40a, 40b) being alternatingly arranged in the cavity sections between the abutment groups.

* * * * *